US012783290B2

(12) United States Patent
Wang et al.

(10) Patent No.: US 12,783,290 B2
(45) Date of Patent: Nov. 3, 2026

(54) METHOD OF EXECUTING TASK FOR LARGE LANGUAGE MODEL, DEVICE, AND STORAGE MEDIUM

(71) Applicant: Beijing Baidu Netcom Science Technology Co., Ltd., Beijing (CN)

(72) Inventors: Guoxia Wang, Beijing (CN); Jinle Zeng, Beijing (CN); Xiyuan Xiao, Beijing (CN); Jiabin Yang, Beijing (CN); Dianhai Yu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 175 days.

(21) Appl. No.: 18/782,617

(22) Filed: Jul. 24, 2024

(65) Prior Publication Data

US 2024/0378077 A1 Nov. 14, 2024

(30) Foreign Application Priority Data

Jun. 18, 2024 (CN) ......................... 202410789531.7

(51) Int. Cl.
*G06F 40/40* (2020.01)
*G06F 9/48* (2006.01)

(52) U.S. Cl.
CPC ............ *G06F 9/4843* (2013.01); *G06F 40/40* (2020.01)

(58) Field of Classification Search
None
See application file for complete search history.

(56) References Cited

U.S. PATENT DOCUMENTS

2021/0383191 A1* 12/2021 Ainslie ................ G06N 3/0455
2023/0133305 A1* 5/2023 Wang ...................... G06F 17/16 706/41
2023/0153381 A1* 5/2023 Wang ..................... G06V 10/50 382/159

FOREIGN PATENT DOCUMENTS

CN 116932728 A 10/2023
JP H06161814 A 6/1994

OTHER PUBLICATIONS

Dao, Tri, "FlashAttention-2: Faster Attention with Better Parallelism and Work Partitioning", Jul. 18, 2023 (Year: 2023).*

* cited by examiner

*Primary Examiner* — Nafiz E Hoque
(74) *Attorney, Agent, or Firm* — Keating & Bennett, LLP

(57) ABSTRACT

A method of executing a task for a large language model, a device, and a storage medium are provided, which relate to a field of artificial intelligence technology, and in particular to fields of deep learning, large language model, natural language processing and computer vision technologies. The method includes: determining, by using a determination unit, a target attention task from a plurality of attention tasks to be processed, based on a sparse representation corresponding to a feature to be processed, where the target attention task is a task corresponding to a non-fully masked region of the feature, the sparse representation represents a mask position of the feature, and the mask position represents mask endpoint positions in at least two non-intersecting intervals in a mask matrix corresponding to the feature; and executing the target attention task by using a computing unit, so as to obtain an attention feature.

20 Claims, 8 Drawing Sheets

300A

300A

300B

500

600

METHOD OF EXECUTING TASK FOR LARGE LANGUAGE MODEL, DEVICE, AND STORAGE MEDIUM

CROSS-REFERENCE TO RELATED APPLICATION(S)

This application claims the benefit of Chinese Patent Application No. 202410789531.7 filed on Jun. 18, 2024, the whole disclosure of which is incorporated herein by reference.

TECHNICAL FIELD

The present disclosure relates to a field of artificial intelligence technology, and in particular to fields of deep learning, large language model, natural language processing and computer vision technologies. Specifically, the present disclosure relates to a method of executing a task for a large language model, a device, and a storage medium.

BACKGROUND

Large language model (LLM) refers to advanced artificial intelligence algorithms trained on a large amount of data. A natural language processing system with more than 100 billion parameters may be applied to content generation, text summarization, chatbots, coding, and customized AI applications for predicting protein structures and biomolecular properties.

Current large language models mainly utilize Transformer architecture to implement attention mechanism-based feature processing.

SUMMARY

The present disclosure provides a method of executing a task for a large language model, a device, and a storage medium.

According to an aspect of the present disclosure, a method of executing a task for a large language model is provided, including: determining, by using a determination unit, a target attention task from a plurality of attention tasks to be processed, based on a sparse representation corresponding to a feature to be processed, where the target attention task is a task corresponding to a non-fully masked region of the feature to be processed, the sparse representation represents a mask position of the feature to be processed, and the mask position represents mask endpoint positions in at least two non-intersecting intervals in a mask matrix corresponding to the feature to be processed; and executing the target attention task by using a computing unit, so as to obtain an attention feature.

According to another aspect of the present disclosure, an electronic device is provided, including: at least one processor; and a memory communicatively connected to the at least one processor, where the memory stores instructions executable by the at least one processor, and the instructions are configured to, when executed by the at least one processor, cause the at least one processor to implement the method provided in the present disclosure.

According to another aspect of the present disclosure, a non-transitory computer-readable storage medium having computer instructions therein is provided, where the computer instructions are configured to cause a computer to implement the method provided in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure. In the accompanying drawings.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as just exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

Transformer is a foundation of a target large language model and may handle natural language problems in a complex scenario. A calculation process of Transformer relies on an attention mechanism. In a training process of a large language model, different mask matrices are generally referenced according to training stages and training tasks, so that the large language model may selectively ignore a masked feature portion when executing an attention task, thereby improving a processing performance of the large language model.

In a relevant example, a mask shape is generally [B, A, S, S], where B represents a batch size, A represents a number of heads, and S represents a length of a feature sequence. Such masking method not only incurs a memory occupation and memory access overhead at a square level of a sequence length on hardware resources, but also results in a large amount of invalid calculations on a masked region during the execution of attention tasks, which affects a processing efficiency of the model.

In another example, a sparse or low-rank attention mechanism adopts a coarse-grained masking method, which may reduce a computational overhead but has a significant impact on an accuracy of the model.

In view of this, in order to reduce the occupation of graphics memory by efficient masks and the memory access overhead of invalid calculations, embodiments of the present disclosure provide a method of executing a task for a large language model, including: determining, by using a determination unit, a target attention task from a plurality of attention tasks to be processed based on a sparse representation corresponding to a feature to be processed, where the target attention task is a task corresponding to a non-fully masked region of the feature to be processed, the sparse representation is used to represent a mask position of the feature to be processed, and the mask position represents mask endpoint positions in at least two non-intersecting intervals in a mask matrix corresponding to the feature to be processed; and performing a target attention task by using a computing unit, so as to obtain an attention feature.

Figure 1:
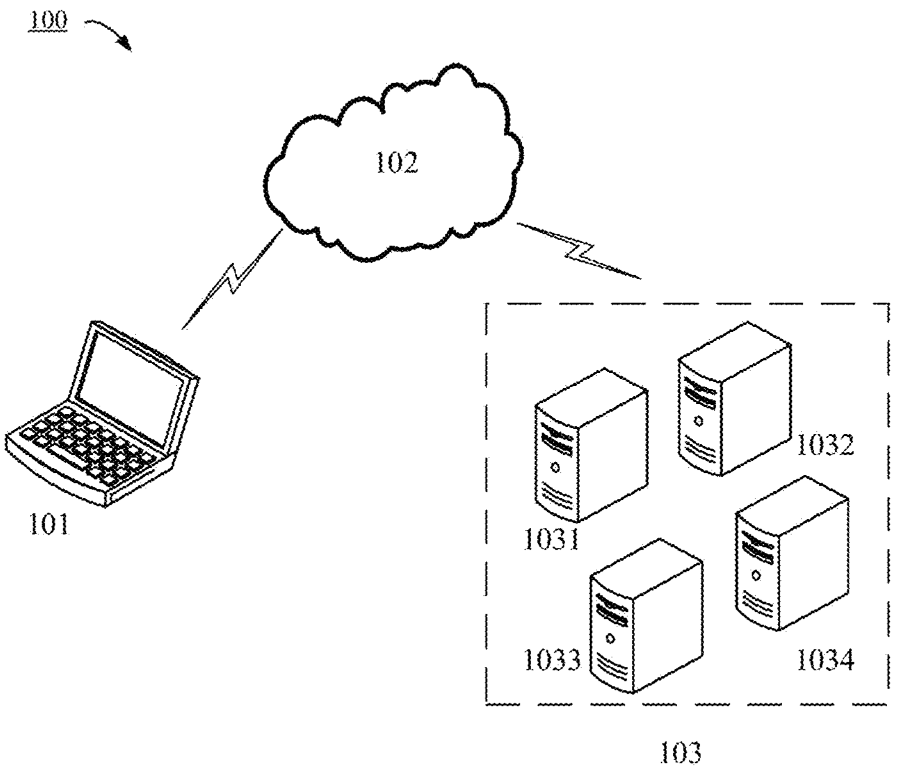
FIG. 1 schematically shows an exemplary system architecture to which a method and an apparatus of executing a task for a large language model may be applied according to embodiments of the present disclosure.

FIG. 1 schematically shows an exemplary system architecture to which a method and an apparatus of executing a task for a large language model may be applied according to embodiments of the present disclosure.

It should be noted that FIG. 1 is just an example of the system architecture to which embodiments of the present disclosure may be applied, so as to help those skilled in the art understand technical contents of the present disclosure. However, it does not mean that embodiments of the present disclosure may not be applied to other devices, systems, environments or scenarios. For example, in other embodiments, the exemplary system architecture to which the method and the apparatus of executing the task for the large language model may be applied may include a terminal device, but the terminal device may implement the method and the apparatus of executing the task for the large language model without interacting with a server.

As shown in FIG. 1, the system architecture according to such embodiments may include a terminal device 101, a network 102, and a server cluster 103. The network 102 is a medium for providing a communication link between the terminal device 101 and the server cluster 103. The network 102 may also be a medium for providing a communication link inside the server cluster 103. The network 102 may include various connection types, such as wired and/or wireless communication links, etc.

The terminal device 101 may be used by a user to interact with the server cluster 103 through the network 102 to receive or send messages, etc. For example, the terminal device 101 may send the server cluster 103 a request for training a deep learning model through the network 102.

The terminal device 101 may be installed with various communication client applications, such as knowledge reading applications, web browser applications, search applications, instant messaging tools, email clients and/or social platform software, etc. (just for example).

The terminal device 101 may be various electronic devices having display screens and supporting web browsing, including but not limited to smart phones, tablet computers, laptop computers, and desktop computers, etc.

The server cluster 103 may be a server providing various services, such as a background management server (just for example) that provides a support for a request sent by the user using the terminal device 101.

The server cluster 103 may be a cloud server, also known as a cloud computing server or a cloud host, which is a host product in a cloud computing service system to solve shortcomings of difficult management and weak business scalability existing in a conventional physical host and VPS (Virtual Private Server) service. The server may also be a server of a distributed system or a server combined with a block-chain.

The server cluster 103 includes a plurality of server nodes 1031, 1032, 1033 and 1034, each of which includes one or more hardware devices. The server cluster 103 or the server nodes may be used to perform the method of executing the task for the large language model provided in the present disclosure to achieve deployment, inference or training of the large language model with few computational resources and storage resources.

It may be understood that the system architecture of the present disclosure has been explained above, and the method of the present disclosure will be explained below.

Figure 2:
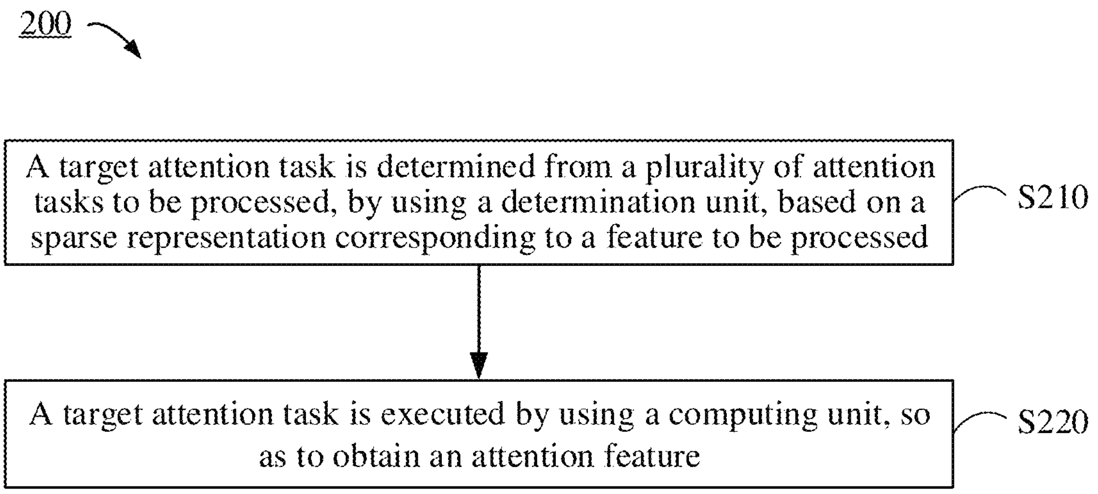
FIG. 2 schematically shows a flowchart of a method of executing a task for a large language model according to embodiments of the present disclosure.

FIG. 2 schematically shows a flowchart of a method of executing a task for a large language model according to embodiments of the present disclosure.

As shown in FIG. 2, a method 200 includes operation S210 to operation S220.

In operation S210, a target attention task is determined from a plurality of attention tasks to be processed, by using a determination unit, based on a sparse representation corresponding to a feature to be processed.

In operation S220, the target attention task is executed by using a computing unit, so as to obtain an attention feature.

According to embodiments of the present disclosure, the determination unit and the computing unit may include at least one of a central processing unit (CPU), a graphics processing unit (GPU), or an artificial intelligence computing unit. The artificial intelligence computing unit may include at least one of a neural network processing unit (NPU), a tensor processing unit (TPU), or a Kunlun chip.

According to embodiments of the present disclosure, the sparse representation is used to represent a mask position of the feature to be processed, and may be used as an expression of the mask shape. The mask position represents mask endpoint positions in at least two non-intersecting intervals in a mask matrix corresponding to the feature to be processed.

For example, the sparse representation may express a mask having a shape of [B,A,S,n], where B represents a batch size, A represents a number of heads, S represents a length of a feature sequence, n=dk, k represents a number of non-intersecting intervals that the feature sequence in S dimension is divided into, and d represents a number of elements used to identify the mask endpoint positions in each interval.

When d=1, it may indicate that one element is used to identify the mask endpoint position in the interval, which may be a start endpoint position or a termination endpoint position. When the mask endpoint position is identified by the start endpoint position, it indicates that a masked region is from the start endpoint to a regional boundary line. When the mask endpoint position is identified by the termination endpoint position, it indicates that the masked region is from the regional boundary line to the termination endpoint.

When d=2, it may indicate that two elements are used to identify the mask endpoint position in the interval, including both the start endpoint position and the termination endpoint position.

Figure 3A:
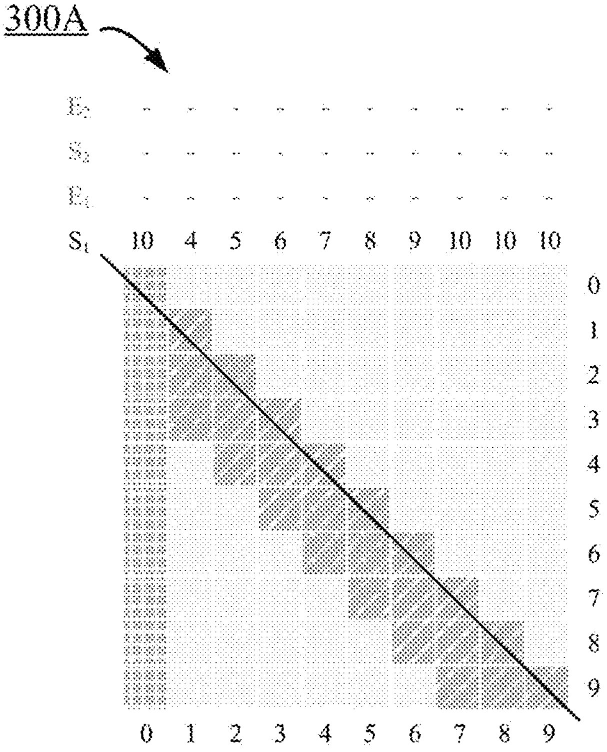
FIG. 3A to FIG. 3D schematically show schematic diagrams of masks in a causal scenario according to embodiments of the present disclosure.

FIG. 3A schematically shows a schematic diagram of a mask in a causal scenario according to embodiments of the present disclosure.

Figure 3B:
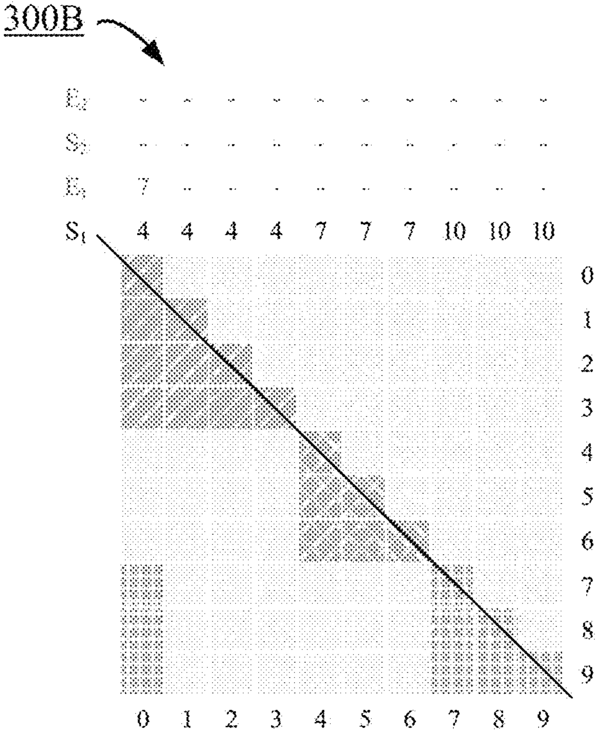

FIG. 3B schematically shows a schematic diagram of a mask in a causal scenario according to embodiments of the present disclosure.

In FIG. 3A and FIG. 3B, the mask matrix may be divided into a lower left region and an upper right region by using a diagonal as a boundary. The upper right region has already been masked, and it is possible to only express a mask situation of the lower left region. As shown, $S_1$ and $E_1$ represent a start mask endpoint position and a termination mask endpoint position in the lower left region, respectively; $S_2$ and $E_2$ represent a start mask endpoint position and a termination mask endpoint position in the lower left region, respectively. A shaded region represents a non-masked region, and a light gray region represents a masked region.

As shown in FIG. 3A, in a schematic mask diagram 300A, in the lower left region, the masked region in column 1 starts from row 4 and ends at the boundary line, so $S_1=4$. Columns 0, 7, 8 and 9 are all non-masked regions, so $S_1=10$, or $S_1$ may be infinite. In such scenario, since each masked region ends at the boundary line, the sparse representation may have a shape of [B,A,S,2].

As shown in FIG. 3B, in a schematic mask diagram 300B, in the lower left region, the masked region in column 0 starts from row 4 and ends at row 7, so $S_1=4$ and $E_1=7$. In such scenario, since the masked regions do not all end at the boundary line, the sparse representation may have a shape of [B,A,S,4].

It should be noted that since the upper right region of the schematic mask diagram 300A and the upper right region of the schematic mask diagram 300B are masked, the sparse representation in the causal scenario may also be simplified as [B,A,S,1] (corresponding to FIG. 3A) and [B,A,S,2] (corresponding to FIG. 3B) in order to further reduce the memory occupation and access overhead caused by the sequence length. Such simplified sparse representation is only applicable to a causal scenario with a simple mask form.

According to embodiments of the present disclosure, the attention task may be a multi-head self-attention task corresponding to the large language model. For example, the plurality of attention tasks may correspond to modules inferring based on multi-head self-attention mechanism in a plurality of processing layers of the above-mentioned large language model.

According to embodiments of the present disclosure, an attention mechanism-based calculation equation is as follows.

$$\text{Attention}(Q, K, V) = softmax\left(\frac{QK^T}{\sqrt{d_k}} + M\right)V \tag{1}$$

where Q, K and V respectively represent a query matrix, a key matrix, and a value matrix, all of which have a shape of [B,S,A,H]. H represents a head size, and B, S and A have the same meanings as described above, which will not be repeated here. M represents a mask matrix.

When an attention calculation is performed according to Equation (1), if an intermediate feature calculated from $$\frac{QK^T}{\sqrt{d_k}}$$

is added to the masked region in the corresponding mask matrix, a calculation result of the attention mechanism is 0.

Therefore, an early matrix operation for this part is actually invalid and instead generate additional computational overhead. It is possible to use the determination unit to determine whether the current attention task to be processed is a task corresponding to a fully-masked region, so as to skip the task corresponding to the fully-masked region before executing the attention task, thereby reducing the computational overhead during the execution of the attention task.

According to embodiments of the present disclosure, the target attention task may be a task corresponding to a non-fully masked region of the feature to be processed. For example, the target attention task may include a task corresponding to a partially-masked region and/or a task corresponding to a non-masked region. Then, the computing unit may perform an attention calculation only on the task corresponding to the non-fully masked region, so as to obtain the attention feature.

According to embodiments of the present disclosure, by determining a task corresponding to the non-fully masked region of the feature to be processed from a plurality of attention tasks to be processed by using the determination unit based on the sparse representation corresponding to the feature to be processed, it is possible to skip the task corresponding to the fully-masked region before executing the attention task. By performing the attention calculation only on the task corresponding to the non-fully masked region using the computing unit to obtain the attention feature, it is possible to reduce the computational overhead during the execution of attention tasks.

With increasing applicability of large language models in various scenarios, it is needed to accurately express mask shapes in different scenarios within a spatiotemporal overhead at a linear level of a feature sequence length, so as to reduce the memory occupation and computational overhead without a loss of accuracy.

Therefore, the method provided in embodiments of the present disclosure further includes: performing a sparse representation task by using a sparse representation unit, so as to perform a sparse representation on the feature to be processed based on a scenario category corresponding to a task to be processed.

According to embodiments of the present disclosure, the scenario category may include a causal scenario, a non-causal scenario, and a complex scenario. The causal scenario may be, for example, an item recommendation scenario for advertising placement. The non-causal scenario may be, for example, a text recognition scenario. The complex scenario may be, for example, a multi-modal task recognition scenario.

According to embodiments of the present disclosure, performing the sparse representation on the feature to be processed based on the scene category corresponding to the task to be processed may include: dividing the mask matrix into a first interval and a second interval by using a diagonal of the mask matrix in response to the scenario category being a causal scenario, where the first interval and the second interval do not intersect with each other, and all elements in the first interval are masked; and performing a sparse representation on the feature to be processed by using a mask endpoint position in the second interval.

According to embodiments of the present disclosure, the mask endpoint position may include a mask start row and a mask termination row in each column of elements in the second interval of the mask matrix corresponding to the feature to be processed.

Figure 3C:
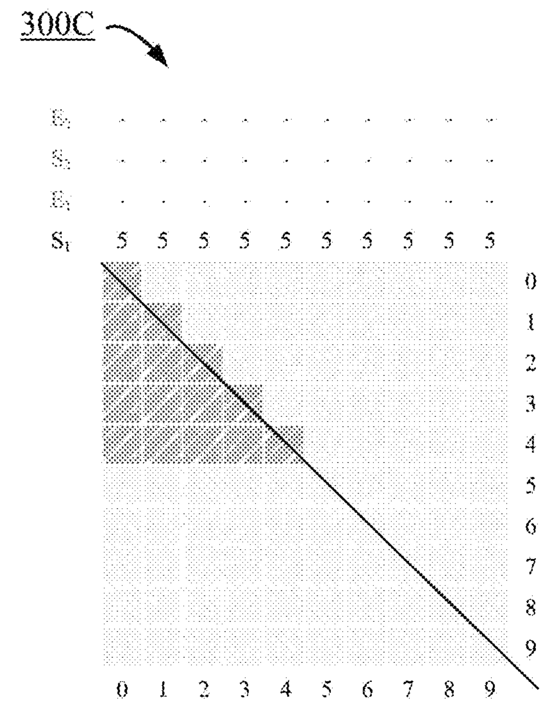

FIG. 3C schematically shows a schematic diagram of a mask in a causal scenario according to embodiments of the present disclosure.

Figure 3D:
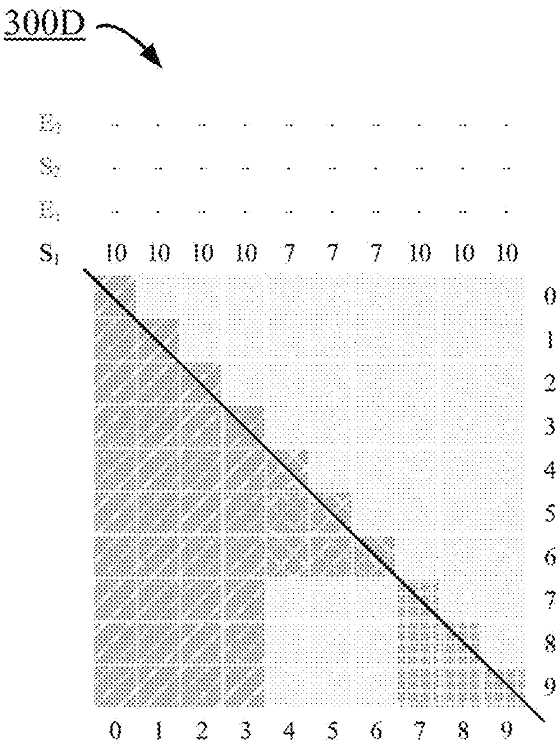

FIG. 3D schematically shows a schematic diagram of a mask in a causal scenario according to embodiments of the present disclosure.

The meanings of illustrations in FIG. 3C and FIG. 3D are the same as those described in FIG. 3A and FIG. 3B above, which will not be repeated here. The first interval may be the upper right region, and the second interval may be the lower left region.

As shown in FIG. 3C, in a schematic mask diagram 300C, the mask start rows in columns 0-9 are all row 5, the mask termination rows in columns 0-9 are all the boundary line, and the sequence length S is 10. When it is required to represent the mask termination row, the sparse representation may be [B,A,10,2]. When it is not required to represent the mask termination row, the sparse representation may be [B,A,10,1], and the corresponding values may be [[5], [5], [5], [5], [5], [5], [5], [5], [5], [5]].

As shown in FIG. 3D, in a schematic mask diagram 300D, columns 0-3 and lines 7-9 are not masked, the mask start rows in columns 4-6 are all row 7, the mask termination rows in columns 4-6 are all the boundary line, and the sequence length S is 10. When it is required to represent the mask termination row, the sparse representation may be [B,A,10,2]. When it is not required to represent the mask termination row, the sparse representation may be [B,A,10, 1], and the corresponding values may be [[10], [10], [10], [10], [7], [7], [7], [10], [10], [10]].

According to embodiments of the present disclosure, the mask matrix is divided into a third interval and a fourth interval by using the diagonal of the mask matrix in response to the scenario category being a non-causal scenario, where the third interval and the fourth interval do not intersect with each other. A sparse representation is performed on the feature to be processed by using the mask endpoint position in the third interval and the mask endpoint position in the fourth interval.

According to embodiments of the present disclosure, the mask endpoint position may include the mask start row and the mask termination row in each column of elements in the third interval of the mask matrix corresponding to the feature to be processed, and the mask start row and the mask termination row in each column of elements in the fourth interval.

Figure 4A:
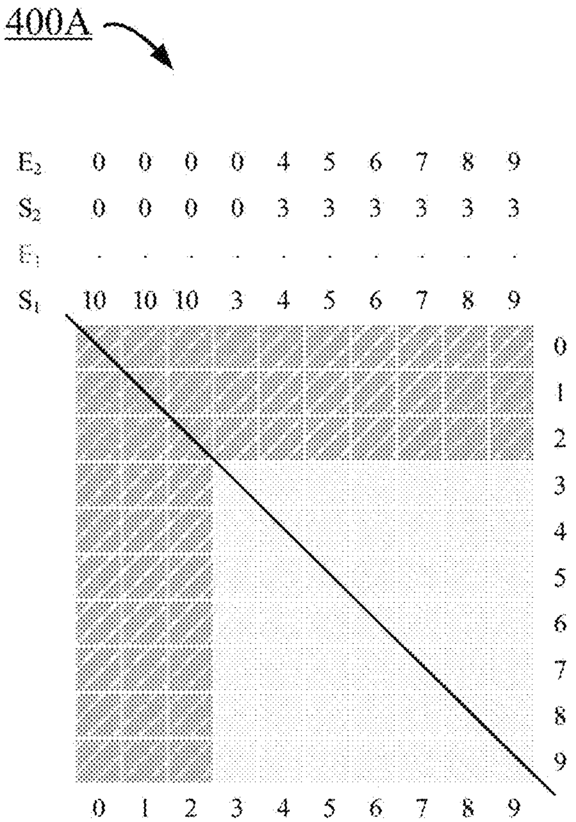
FIG. 4A to FIG. 4B schematically show schematic diagrams of masks in a non-causal scenario according to embodiments of the present disclosure.
Figure 4B:
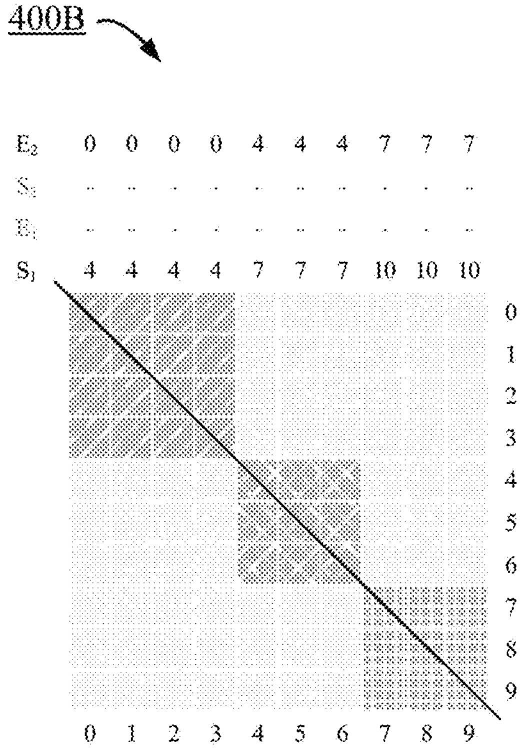

FIG. 4A to FIG. 4B schematically show schematic diagrams of masks in a non-causal scenario according to embodiments of the present disclosure.

The meanings of illustrations in FIG. 4A and FIG. 4B are the same as those described in FIG. 3A and FIG. 3B above. The third interval may be the upper right region, and the fourth interval may be the lower left region.

As shown in FIG. 4A, in a schematic mask diagram 400A, in the lower left region, columns 0-2 are all non-masked regions, the mask termination rows in columns 3-9 are all the boundary line, and the mask start rows in columns 3-9 are rows 3-9 respectively. In the upper right region, columns 0-2 are all non-masked regions, the mask of column 3 has been represented in the lower left region, the mask start row in column 4 is row 3, and the mask termination row in column 4 is row 4, then $S_2=3$ and $E_2=4$ for the corresponding column, and so on.

As shown in FIG. 4B, in a schematic mask diagram 400B, in the lower left region, the mask start rows in columns 0-3 are row 4, and the mask termination rows in columns 0-3 are the boundary line; the mask start rows in columns 4-6 are row 7, and the mask termination rows in columns 4-6 are the boundary line; columns 7-9 are all non-masked regions. In the upper right region, columns 0-3 are non-masked regions; the mask start rows in columns 4-6 are the boundary line, and the mask termination rows in columns 4-6 are row 4; the mask start rows in columns 7-9 are the boundary line, and the mask termination rows in columns 7-9 are row 7. Therefore, the sparse representation may be [B,A,10,2], and the values may be [[0,4], [0,4], [0,4], [0,4], [4,7], [4,7], [4,7], [7,10], [7,10], [7,10]].

In the above-mentioned two scenarios, the mask shape is simple, and the mask matrix is divided into only two regions to achieve an accurate expression of the mask shape. However, for a schematic diagram of a mask in a complex scenario shown in FIG. 5, it is needed to divide the mask matrix into more non-intersecting intervals to accurately express the mask shape.

Figure 5:
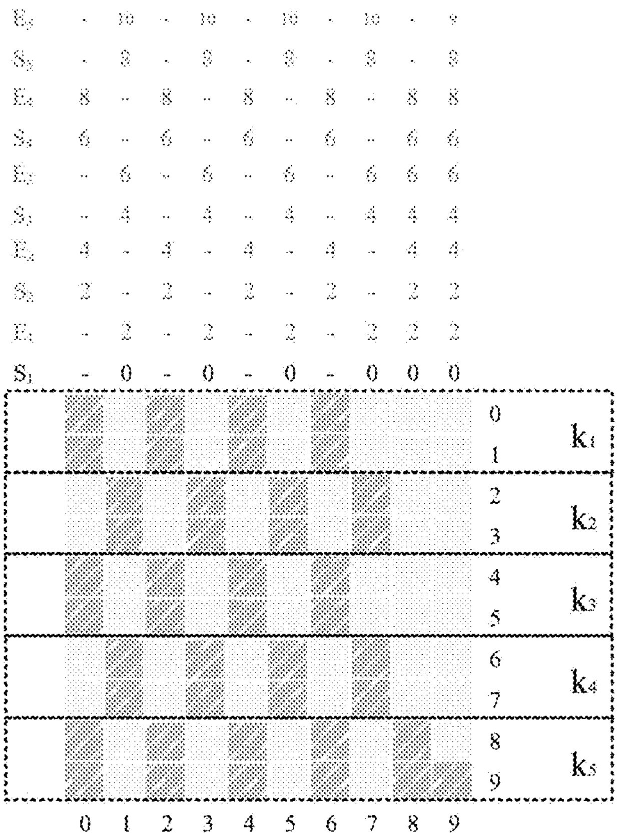
FIG. 5 schematically shows a schematic diagram of a mask in a complex scenario according to embodiments of the present disclosure.

FIG. 5 schematically shows a schematic diagram of a mask in a complex scenario according to embodiments of the present disclosure.

As shown in FIG. 5, in a schematic mask diagram 500, every two rows may be used as an interval, a shaded region represents a non-masked region, and a light gray region represents a masked region. $S_1$-$S_5$ respectively represent the mask start row in each column of elements in each interval; $E_1$-$E_5$ respectively represent the mask termination rows in each column of elements in each interval.

For example, for column 0, in interval $k_1$, it is a non-masked region; in interval $k_2$, the mask start row is row 2, and the mask termination row is row 4 (because the mask termination row is the boundary line of the interval, the representation of the termination row may also be omitted), so $S_2=2$ and $E_2=4$ for the corresponding column; in interval $k_3$, it is a non-masked region; in interval $k_4$, the mask start row is row 6, the mask termination row is row 8, so $S_4=6$ and $E_4=8$ for the corresponding column; in interval $k_5$, it is a non-masked region. Therefore, the sparse representation may be [B,A,10,10], and the corresponding values are shown in FIG. 5.

According to embodiments of the present disclosure, by accurately performing a sparse representation on the mask shape in different scenarios, it is possible to reduce the memory occupation and computational overhead without a loss of accuracy within the spatiotemporal overhead at a linear level of the feature sequence length.

Parameters involved in processing of a large language model may be hundreds of billions in the process of executing tasks. In order to improve a processing efficiency of the model, a feature may be partitioned and processed in parallel by a plurality of distributed GPUs.

Therefore, the method of executing the task for the large language model provided in embodiments of the present disclosure further includes: performing a partitioning task by using a partitioning unit, so as to partition a parameter matrix corresponding to the feature to be processed based on a length of the parameter matrix corresponding to the feature to be processed and a number of registers to obtain a parameter matrix corresponding to each attention task to be processed, where the parameter matrix includes a query matrix, a key matrix, a value matrix and a mask matrix; and storing the query matrix, the key matrix, the value matrix and the mask matrix corresponding to each attention task to be processed by using a target storage unit.

According to embodiments of the present disclosure, it is possible to firstly determine hyper-parameters used for performing the partitioning task based on the length of the parameter matrix corresponding to the feature to be processed and the number of registers, and then partition the parameter matrix corresponding to the feature to be processed based on a matrix multiplication rule to obtain a parameter matrix corresponding to each attention task to be processed.

For example, the query matrix may have a shape of [2,8,1024,128], and may be divided into parameter matrices [2,8,64,128] or [2,8,128,128]. The query matrix may have a shape of [2,8,1024,256] and may be divided into parameter matrices [2,8,32,256] or [2,8,64,256] or [2,8,128,256] or [2,8,256,256].

Figure 6:
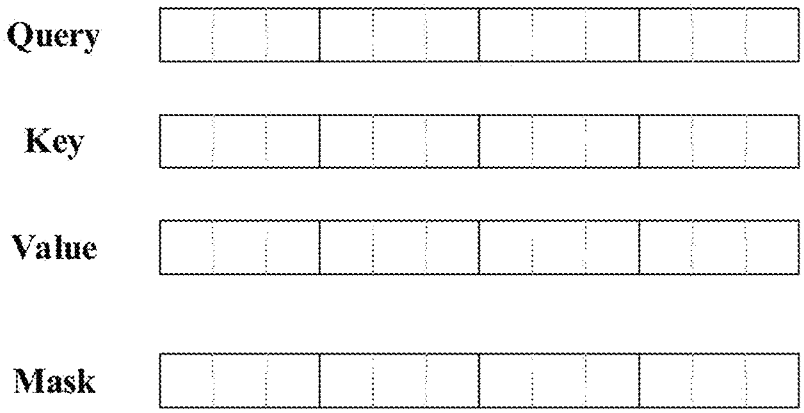
FIG. 6 schematically shows a schematic diagram of partitioning a task to be processed according to embodiments of the present disclosure.

FIG. 6 schematically shows a schematic diagram of partitioning a task to be processed according to embodiments of the present disclosure.

As shown in FIG. 6, the query matrix, the key matrix, the value matrix, and the mask matrix each may be divided into four blocks, and each block includes three elements.

According to embodiments of the present disclosure, the processing efficiency of the large language model may be effectively improved by partitioning the parameter matrix corresponding to the feature to be processed based on the length of the parameter matrix corresponding to the feature to be processed and the number of registers.

According to embodiments of the present disclosure, based on an attention calculation mechanism, a dimension of a matrix obtained by multiplying the query matrix and a transpose of the key matrix is the same as a dimension of the mask matrix. Therefore, the partitioning dimension of the query matrix and the key matrix determines the partitioning dimension of the mask matrix.

Therefore, it is possible to determine whether the attention task to be processed is an invalid task by determining the mask interval corresponding to a plurality of attention tasks to be processed, so as to reduce the computational overhead of invalid tasks in the process of executing attention tasks.

According to embodiments of the present disclosure, determining the target attention task from the plurality of attention tasks to be processed by using the determination unit based on the sparse representation corresponding to the feature to be processed may include: determining a mask interval corresponding to the plurality of attention tasks to be processed based on the sparse representation corresponding to the feature to be processed; and determining the target attention task from the plurality of attention tasks to be processed by using the determination unit based on the mask interval.

According to embodiments of the present disclosure, the mask interval may represent a region between the mask start endpoint and the mask termination endpoint, so as to determine an intermediate calculation result of which task among the attention tasks to be processed is located in the mask interval, thereby determining the attention task to be processed in the mask interval as an invalid task before executing the attention task.

Since the partitioning is performed based on the feature matrices corresponding to the attention tasks of the same head in the same batch, B and A representations are omitted here. For example, if the query matrix is partitioned into [3,128] and the key matrix is partitioned into [3,128], since Q*K^T=[3,3], it may be determined that the mask matrix is partitioned into [3,3].

Therefore, it is possible to traverse each [3,3] block to determine whether the block is in the mask interval, so as to determine whether the corresponding attention task to be processed is an invalid task.

Figure 7:
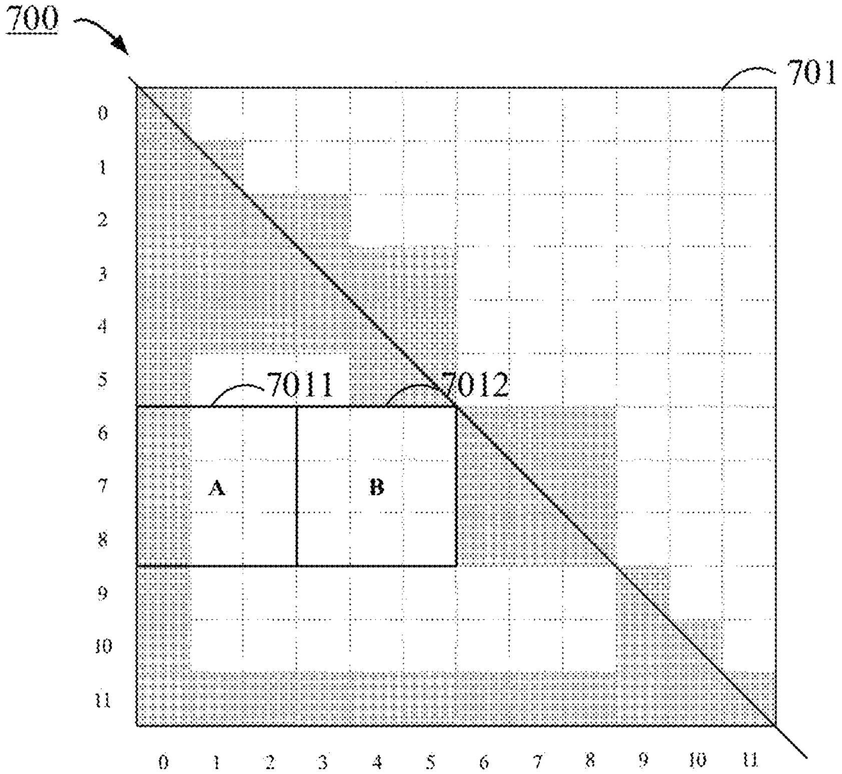
FIG. 7 schematically shows a schematic diagram of determining a target task to be processed according to embodiments of the present disclosure.

FIG. 7 schematically shows a schematic diagram of determining a target task to be processed according to embodiments of the present disclosure.

As shown in FIG. 7, in embodiment 700, the non-shaded region is the masked region, and 701 represents twelve tokens contained in all attention tasks to be processed of a particular head in a particular batch. All regions in [3,3] block 7012 corresponding to an attention task to be processed B are masked regions, and it may be determined that the attention task to be processed B is an invalid task. Some regions in [3,3] block 7011 corresponding to the attention task to be processed A are masked regions, and it may be determined that the attention task to be processed A is a target attention task.

According to embodiments of the present disclosure, by filtering invalid tasks based on the mask interval, it is possible to skip invalid tasks in advance before executing attention tasks, so as to reduce the computational overhead of invalid tasks.

According to embodiments of the present disclosure, determining the mask interval corresponding to the plurality of attention tasks to be processed based on the sparse representation corresponding to the feature to be processed may include: determining, for each attention task to be processed, a plurality of mask endpoint positions in a mask matrix corresponding to the attention task to be processed based on the sparse representation corresponding to the feature to be processed; and determining the mask interval corresponding to each attention task to be processed according to the plurality of mask endpoint positions.

According to embodiments of the present disclosure, each attention task to be processed may be an attention task obtained after partitioning.

Due to different mask shapes in different application scenarios, in order to meet the needs of different application scenarios, the mask position may include the mask start row and the mask termination row in each column of elements in at least two non-intersecting intervals in the mask matrix corresponding to the feature to be processed.

According to embodiments of the present disclosure, determining the mask endpoint position in the mask matrix corresponding to each attention task to be processed based on the sparse representation corresponding to the feature to be processed may include: determining the mask start row and the mask termination row in each column of elements in the mask matrix corresponding to each attention task to be processed based on the sparse representation corresponding to the feature to be processed.

According to embodiments of the present disclosure, determining the mask interval corresponding to each attention task to be processed according to the plurality of mask endpoint positions includes: determining the mask termination row in each column of elements as a termination position of the mask interval; and determining the mask start row in each column of elements as a start position of the mask interval.

As shown in FIG. 7, the shape of the sparse representation may be [B,A,12,4], and the corresponding values are as follows. The mask start row in the lower left region is [12,5,5,5,6,6,9,9,9,12,12,12], the mask termination row in the lower left region is [12,11,11,11,11,11,11,11,11,12,12, 12], the mask start row in the upper right region is [0,0,0, 0,0,0,0,0,0,0,0,0], and the mask termination row in the lower right region is [0,1,2,2,3,3,6,6,6,12,12,12].

According to embodiments of the present disclosure, for the block corresponding to the task to be processed A, the block is in the lower left interval and corresponds to columns 0-2 in the interval. The mask termination rows [12,11,11] in the corresponding columns may be used as the termination position of the mask interval, and the mask start rows [12,5,5] in the corresponding columns may be used as the start position of the mask interval.

According to embodiments of the present disclosure, for the block corresponding to the task to be processed B, the block is in the lower left interval and corresponds to column 3-5 in the interval. The mask termination rows [12,11,11] in the corresponding columns may be used as the termination position of the mask interval, and the mask start rows [5,6,6] in the corresponding columns may be used as the start position of the mask interval.

According to embodiments of the present disclosure, the mask position includes a mask start column and a mask termination column in each row of elements in at least two non-intersecting intervals in the mask matrix corresponding to the feature to be processed.

According to embodiments of the present disclosure, determining the mask endpoint position in the mask matrix corresponding to each attention task to be processed based on the sparse representation corresponding to the feature to be processed may include: determining the mask start column and the mask termination column in each row of elements in the mask matrix corresponding to each attention task to be processed based on the sparse representation corresponding to the feature to be processed.

According to embodiments of the present disclosure, determining the mask interval corresponding to each attention task to be processed according to the plurality of mask endpoint positions may include: determining the mask termination column in each row of elements as the termination position of the mask interval; and determining the mask start column in each row of elements as the start position of the mask interval.

A principle of the method of determining the mask interval by representing the mask position using the mask start column and the mask termination column in each row of elements is the same as a principle of the method of determining the mask interval by representing the mask position using the mask start row and the mask termination row in each column of elements, which will not be repeated here.

According to embodiments of the present disclosure, since the sparse representation accurately expresses the shape of the mask, the mask interval may be quickly determined based on a maximum value (mask termination row/column) and a minimum value (mask start row/column) of the mask rows/columns corresponding to a block of the task to be processed, so that the computational overhead during the determination of invalid tasks may be reduced.

According to embodiments of the present disclosure, determining the target attention task from the plurality of attention tasks to be processed by using the determination unit based on the mask interval may include: determining an attention task to be processed as the target attention task by using the determination unit in response to an element endpoint position in an intermediate feature matrix corresponding to the attention task to be processed not being in the mask interval, where the intermediate feature matrix is obtained according to the query matrix and the key matrix corresponding to the attention task to be processed.

According to embodiments of the present disclosure, it is possible to determine whether an attention task to be processed is the target attention task by calculating an intersection of the element endpoint position and the mask interval. When there is an intersection between the element endpoint position and the mask interval, and all element endpoint positions are located in the mask interval, it may be determined that the task to be processed is an invalid task. When there is a partial intersection or no intersection between the element endpoint position and the mask interval, it may be determined that the task to be processed is the target attention task.

For example, if the element endpoint position in the intermediate feature matrix corresponding to a task to be processed is [3,4] and the mask interval is [5,11], it may be determined that the above-mentioned two intervals have no intersection, and the task to be processed may be determined as the target attention task.

According to embodiments of the present disclosure, the mask interval includes the mask termination position and the mask start position. Determining the attention task to be processed as the target attention task by using the determination unit in response to the element endpoint position in the intermediate feature matrix corresponding to the attention task to be processed not being in the mask interval may include: determining the attention task to be processed as the target attention task by using the determination unit in response to the element endpoint position in the intermediate feature matrix corresponding to the attention task to be processed being greater than the mask termination position or less than the mask start position.

According to embodiments of the present disclosure, the intermediate feature matrix may be $$\frac{QK^T}{\sqrt{d_k}}$$

obtained from Equation (1).

As shown in FIG. 7, for the block corresponding to the task to be processed A, the termination position of the mask interval corresponding to the block is [12,11,11], and the mask start position is [12,5,5].

According to embodiments of the present disclosure, the block corresponding to the task to be processed A is located in rows 6-8 of columns 0-2, and only rows 6-8 of columns 1-2 are located in the mask interval. Since 6 is less than 12, 7 is between 5 and 11, and 8 is between 5 and 11, the elements in the intermediate feature matrix corresponding to the task to be processed A are partially located in the masked region, and the task to be processed A may be determined as the target attention task.

According to embodiments of the present disclosure, for the block corresponding to the task to be processed B, the termination position of the mask interval corresponding to the block is [12,11,11], and the start position is [5,6,6].

According to embodiments of the present disclosure, the block corresponding to the task to be processed B is located in rows 6-8 of columns 3-5. Since 6 is between 5 and 12, 7 is between 6 and 11, and 8 is between 6 and 11, all elements in the intermediate feature matrix corresponding to the task to be processed B are located in the mask interval, indicating that the block corresponding to the task to be processed B is a fully-masked region and may be determined as an invalid task.

According to embodiments of the present disclosure, by comparing the mask interval in the block with the element endpoint task according to a simple and efficient determination logic, it is possible to quickly determine an invalid task in a linear time, so as to skip the invalid task and reduce the computational overhead during the execution of the attention task.

According to embodiments of the present disclosure, performing the target attention task by using the computing unit to obtain the attention feature may include: reading from a target storage unit at least one query matrix, at least one key matrix, at least one value matrix and at least one mask matrix corresponding to the target attention task by using the computing unit; and performing the target attention task by using the target computing unit according to the at least one query matrix, the at least one key matrix, the at least one value matrix and the at least one mask matrix, so as to obtain the attention feature.

Figure 8:
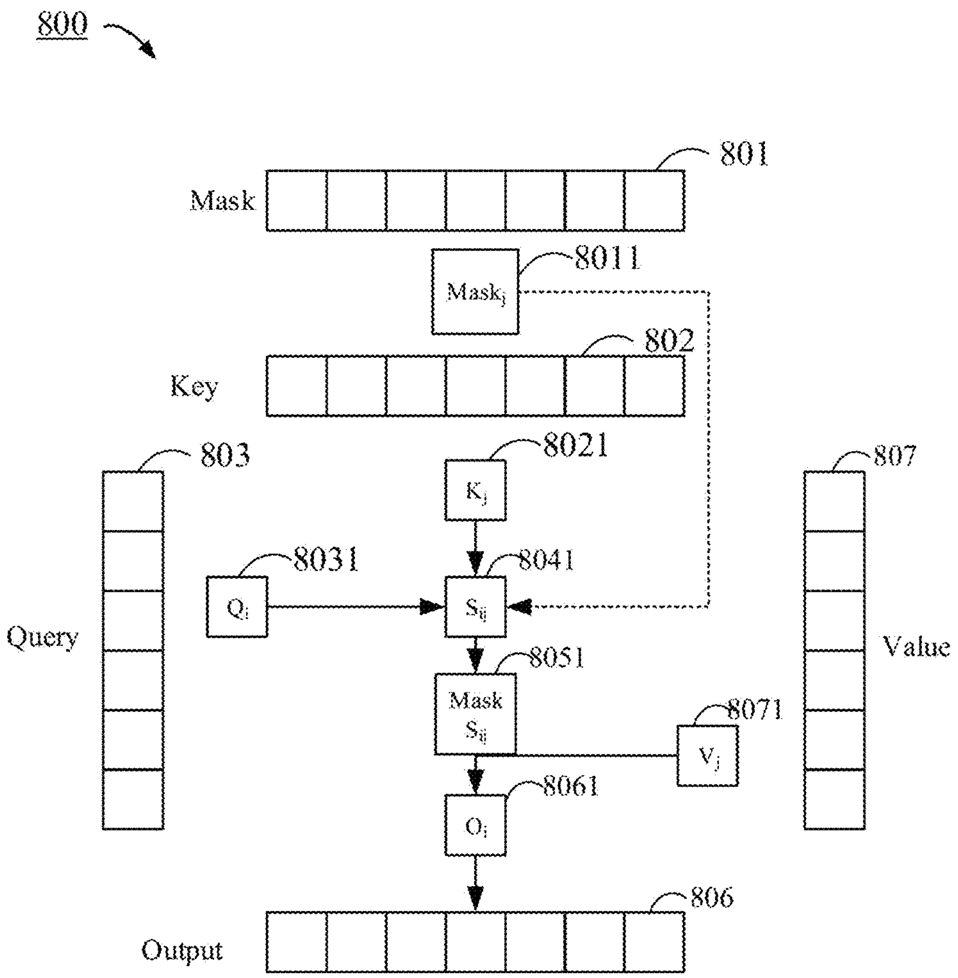
FIG. 8 schematically shows a schematic diagram of performing an attention calculation on a target task to be processed according to embodiments of the present disclosure.

FIG. 8 schematically shows a schematic diagram of performing an attention calculation on a target task to be processed according to embodiments of the present disclosure.

As shown in FIG. 8, in embodiment 800, when executing the target attention task, it is possible to execute the target attention task by using the target computing unit according to at least one query matrix 803, at least one key matrix 802, at least one value matrix 807 and at least one mask matrix 801, so as to obtain an attention feature 806.

For example, it is possible to obtain a first intermediate feature 8041 according to the query matrix 8031 and a transpose of the key matrix 8021, obtain a second intermediate feature 8051 according to the first intermediate feature 8041 and the mask matrix 8011, process the second intermediate feature 8051 by using an activation function to obtain an activation feature matrix, and obtain the attention feature 8061 according to the activation feature matrix and the key matrix 8071.

According to embodiments of the present disclosure, the activation function may be a normalization function.

According to embodiments of the present disclosure, the computing unit performs calculation only on the target attention task, so that an attention calculation process corresponding to invalid tasks may be reduced, and the computational overhead of executing attention tasks may be further reduced.

Figure 9:
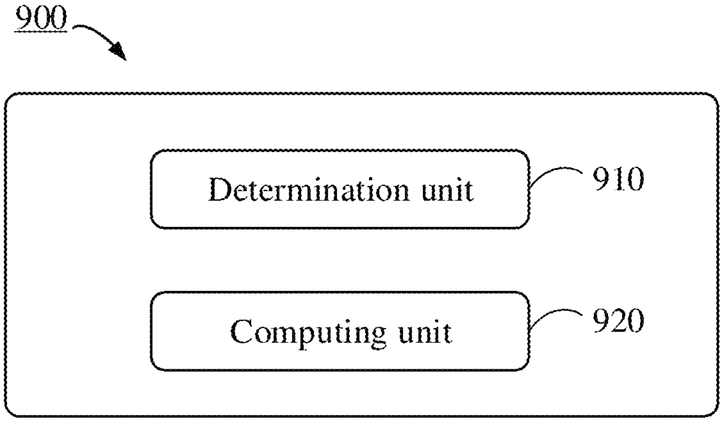
FIG. 9 schematically shows a block diagram of an apparatus of executing a task for a large language model according to embodiments of the present disclosure.

FIG. 9 schematically shows a block diagram of an apparatus of executing a task for a large language model according to embodiments of the present disclosure.

As shown in FIG. 9, an apparatus 900 may include a determination unit 910 and a computing unit 920.

The determination unit 910 is used to determine a target attention task from a plurality of attention tasks to be processed, based on a sparse representation corresponding to a feature to be processed. The target attention task is a task corresponding to a non-fully masked region of the feature to be processed, the sparse representation represents a mask position of the feature to be processed, and the mask position represents mask endpoint positions in at least two non-intersecting intervals in a mask matrix corresponding to the feature to be processed.

The computing unit 920 is used to execute the target attention task to obtain an attention feature.

According to embodiments of the present disclosure, the determination unit includes a first determination sub-unit and a second determination sub-unit. The first determination sub-unit is used to determine a mask interval corresponding to the plurality of attention tasks to be processed based on the sparse representation corresponding to the feature to be processed. The second determination sub-unit is used to determine the target attention task from the plurality of attention tasks to be processed based on the mask interval.

According to embodiments of the present disclosure, the first determination sub-unit is further used to: determine, for each attention task to be processed, a plurality of mask endpoint positions in a mask matrix corresponding to the attention task to be processed based on the sparse representation corresponding to the feature to be processed; and determine the mask interval corresponding to the attention task to be processed according to the plurality of mask endpoint positions.

According to embodiments of the present disclosure, the mask position includes a mask start row and a mask termination row in each column of elements in at least two non-intersecting intervals in the mask matrix corresponding to the feature to be processed. The first determination sub-unit is further used to: determine, based on the sparse representation corresponding to the feature to be processed, the mask start row and the mask termination row in each column of elements in the mask matrix corresponding to the attention task to be processed.

According to embodiments of the present disclosure, the first determination sub-unit is further used to: determine the mask termination row in each column of elements as a termination position of the mask interval; and determine the mask start row in each column of elements as a start position of the mask interval.

According to embodiments of the present disclosure, the mask position includes a mask start column and a mask termination column in each row of elements in at least two non-intersecting intervals in the mask matrix corresponding to the feature to be processed. The first determination sub-unit is further used to: determine, based on the sparse representation corresponding to the feature to be processed, the mask start column and the mask termination column in each row of elements in the mask matrix corresponding to the attention task to be processed.

According to embodiments of the present disclosure, the first determination sub-unit is further used to: determine the mask termination column in each row of elements as a termination position of the mask interval; and determine the mask start column in each row of elements as a start position of the mask interval.

According to embodiments of the present disclosure, the second determination sub-unit is further used to: determine an attention task to be processed as the target attention task by using the determination unit in response to an element endpoint position in an intermediate feature matrix corresponding to the attention task to be processed not being within the mask interval, where the intermediate feature matrix is obtained according to a query matrix corresponding to the attention task to be processed and a key matrix corresponding to the attention task to be processed.

According to embodiments of the present disclosure, the mask interval includes a mask termination position and a mask start position. The second determination sub-unit is further used to: determine the attention task to be processed as the target attention task by using the determination unit in response to the element endpoint position in the intermediate feature matrix corresponding to the attention task to be processed being greater than the mask termination position or less than the mask start position.

According to embodiments of the present disclosure, the computing unit includes a reading sub-unit and a computing sub-unit. The reading sub-unit is used to read, from a target storage unit, at least one query matrix corresponding to the target attention task, at least one key matrix corresponding to the target attention task, at least one value matrix corresponding to the target attention task and at least one mask matrix corresponding to the target attention task by using the computing unit. The computing sub-unit is used to execute the target attention task according to the at least one query matrix, the at least one key matrix, the at least one value matrix and the at least one mask matrix by using the target computing unit, so as to obtain the attention feature.

According to embodiments of the present disclosure, the computing sub-unit is further used to: obtain a first intermediate feature according to the query matrix and a transpose of the key matrix; obtain a second intermediate feature according to the first intermediate feature and the mask matrix; process the second intermediate feature by using an activation function, so as to obtain an activation feature matrix; and obtain the attention feature according to the activation feature matrix and the key matrix.

According to embodiments of the present disclosure, the apparatus further includes a partitioning unit and a target storage unit.

The partitioning unit is used to execute a partitioning task, so as to partition a parameter matrix corresponding to the feature to be processed based on a length of the parameter matrix corresponding to the feature to be processed and a number of registers to obtain a parameter matrix corresponding to each attention task to be processed. The parameter matrix includes a query matrix, a key matrix, a value matrix and a mask matrix.

The target storage unit is used to store the query matrix, the key matrix, the value matrix and the mask matrix corresponding to each attention task to be processed.

According to embodiments of the present disclosure, the apparatus further includes a sparse representation unit used to execute a sparse representation task so as to perform a sparse representation on the feature to be processed based on a scenario category corresponding to the task to be processed.

According to embodiments of the present disclosure, the sparse representation unit includes a first dividing sub-unit and a first representation sub-unit.

The first dividing sub-unit is used to divide the mask matrix into a first interval and a second interval by using a diagonal of the mask matrix in response to the scenario category being a causal scenario, where the first interval and the second interval do not intersect with each other, and all elements in the first interval are masked. The first representation sub-unit is used to perform a sparse representation on the feature to be processed by using a mask endpoint position in the second interval.

According to embodiments of the present disclosure, the sparse representation unit includes a second dividing sub-unit and a second representation sub-unit.

The second dividing sub-unit is used to divide the mask matrix into a third interval and a fourth interval by using a diagonal of the mask matrix in response to the scenario category being a non-causal scenario, where the third interval and the fourth interval do not intersect with each other.

The second representation sub-unit is used to perform a sparse representation on the feature to be processed by using a mask endpoint position in the third interval and a mask endpoint position in the fourth interval.

According to embodiments of the present disclosure, the present disclosure further provides a device of executing a task for a large language model, which includes the above-mentioned apparatus.

According to embodiments of the present disclosure, the present disclosure further provides an electronic device, a readable storage medium, and a computer program product.

According to embodiments of the present disclosure, an electronic device is provided, including: at least one processor; and a memory communicatively connected to the at least one processor. The memory stores instructions executable by the at least one processor, and the instructions are used to, when executed by the at least one processor, cause the at least one processor to implement the method described above.

According to embodiments of the present disclosure, a non-transitory computer-readable storage medium having computer instructions therein is provided, and the computer instructions are used to cause a computer to implement the method described above.

According to embodiments of the present disclosure, a computer program product containing a computer program is provided, and the computer program is used to, when executed by a processor, cause the processor to implement the method described above.

Figure 10:
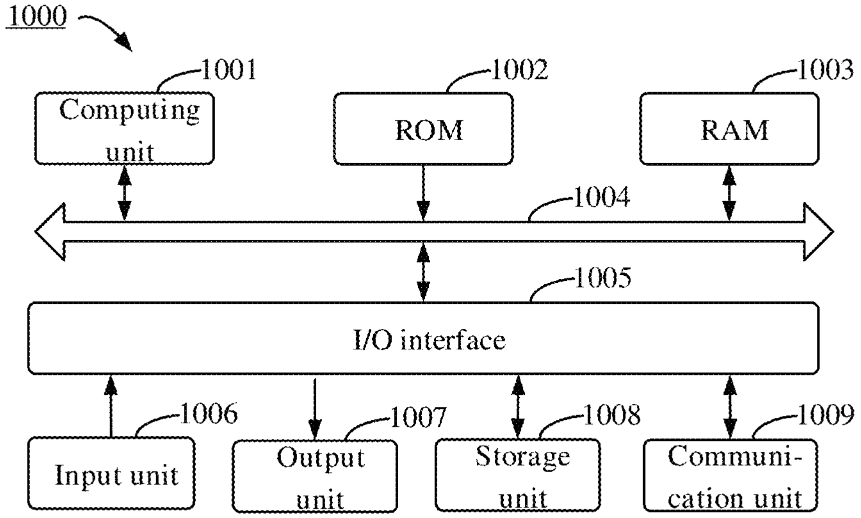
FIG. 10 schematically shows a block diagram of an electronic device suitable for implementing a method of executing a task for a large language model according to embodiments of the present disclosure.

FIG. 10 schematically shows a schematic block diagram of an example electronic device 1000 that may be used to implement embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 10, the electronic device 1000 includes a computing unit 1001 which may perform various appropriate actions and processes according to a computer program stored in a read only memory (ROM) 1002 or a computer program loaded from a storage unit 1008 into a random access memory (RAM) 1003. In the RAM 1003, various programs and data necessary for an operation of the electronic device 1000 may also be stored. The computing unit 1001, the ROM 1002 and the RAM 1003 are connected to each other through a bus 1004. An input/output (I/O) interface 1005 is also connected to the bus 1004.

A plurality of components in the electronic device 1000 are connected to the I/O interface 1005, including: an input unit 1006, such as a keyboard, or a mouse; an output unit 1007, such as displays or speakers of various types; a storage unit 1008, such as a disk, or an optical disc; and a communication unit 1009, such as a network card, a modem, or a wireless communication transceiver. The communication unit 1009 allows the electronic device 1000 to exchange information/data with other devices through a computer network such as Internet and/or various telecommunication networks.

The computing unit 1001 may be various general-purpose and/or dedicated processing assemblies having processing and computing capabilities. Some examples of the computing unit 1001 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1001 executes various methods and processes described above, such as the method of executing the task for the large language model. For example, in some embodiments, the method of executing the task for the large language model may be implemented as a computer software program which is tangibly embodied in a machine-readable medium, such as the storage unit 1008. In some embodiments, the computer program may be partially or entirely loaded and/or installed in the electronic device 1000 via the ROM 1002 and/or the communication unit 1009. The computer program, when loaded in the RAM 1003 and executed by the computing unit 1001, may execute one or more steps in the method of executing the task for the large language model described above. Alternatively, in other embodiments, the computing unit 1001 may be used to perform the method of executing the task for the large language model by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, speech input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. A relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of executing a task for a large language model, comprising:

determining, by using a determination unit, a target attention task from a plurality of attention tasks to be processed, based on a sparse representation corresponding to a feature to be processed, wherein the target attention task is a task corresponding to a non-fully masked region of the feature to be processed, the sparse representation represents a mask position of the feature to be processed, and the mask position represents mask endpoint positions in at least two non-intersecting intervals in a mask matrix corresponding to the feature to be processed; and executing the target attention task by using a computing unit, so as to obtain an attention feature, wherein the determining, by using the determination unit, the target attention task from the plurality of attention tasks to be processed based on the sparse representation corresponding to the feature to be processed comprises:

determining a mask interval corresponding to the plurality of attention tasks to be processed based on the sparse representation corresponding to the feature to be processed; and determining, by using the determination unit, the target attention task from the plurality of attention tasks to be processed based on the mask interval.

2. The method according to claim 1, wherein the determining the mask interval corresponding to the plurality of attention tasks to be processed based on the sparse representation corresponding to the feature to be processed comprises:

determining, for each attention task to be processed, a plurality of mask endpoint positions in a mask matrix corresponding to each attention task to be processed based on the sparse representation corresponding to the feature to be processed; and determining the mask interval corresponding to each attention task to be processed according to the plurality of mask endpoint positions.

3. The method according to claim 2, wherein the mask position comprises a mask start row and a mask termination row in each column of elements in at least two non-intersecting intervals in the mask matrix corresponding to the feature to be processed; and wherein the determining, for each attention task to be processed, a plurality of mask endpoint positions in the mask matrix corresponding to each attention task to be processed based on the sparse representation corresponding to the feature to be processed comprises:

determining, based on the sparse representation corresponding to the feature to be processed, the mask start row and the mask termination row in each column of elements in the mask matrix corresponding to each attention task to be processed.

4. The method according to claim 3, wherein the determining the mask interval corresponding to each attention task to be processed according to the plurality of mask endpoint positions comprises:

determining the mask termination row in each column of elements as a termination position of the mask interval; and determining the mask start row in each column of elements as a start position of the mask interval.

5. The method according to claim 2, wherein the mask position comprises a mask start column and a mask termination column in each row of elements in at least two non-intersecting intervals in the mask matrix corresponding to the feature to be processed; and wherein the determining, for each attention task to be processed, a plurality of mask endpoint positions in the mask matrix corresponding to each attention task to be processed based on the sparse representation corresponding to the feature to be processed comprises:

determining, based on the sparse representation corresponding to the feature to be processed, the mask start column and the mask termination column in each row of elements in the mask matrix corresponding to each attention task to be processed.

6. The method according to claim 5, wherein the determining the mask interval corresponding to each attention task to be processed according to the plurality of mask endpoint positions comprises:

determining the mask termination column in each row of elements as a termination position of the mask interval; and determining the mask start column in each row of elements as a start position of the mask interval.

7. The method according to claim 1, wherein the determining, by using the determination unit, the target attention task from the plurality of attention tasks to be processed based on the mask interval comprises:

determining an attention task to be processed as the target attention task by using the determination unit in response to an element endpoint position in an intermediate feature matrix corresponding to the attention task to be processed not being within the mask interval, wherein the intermediate feature matrix is obtained according to a query matrix corresponding to the attention task to be processed and a key matrix corresponding to the attention task to be processed.

8. The method according to claim 7, wherein the mask interval comprises a mask termination position and a mask start position; and wherein the determining an attention task to be processed as the target attention task by using the determination unit in response to an element endpoint position in an intermediate feature matrix corresponding to the attention task to be processed not being within the mask interval comprises:

determining the attention task to be processed as the target attention task by using the determination unit in response to the element endpoint position in the intermediate feature matrix corresponding to the attention task to be processed being greater than the mask termination position or less than the mask start position.

9. The method according to claim 1, wherein the executing the target attention task by using a computing unit so as to obtain an attention feature comprises:

reading, from a target storage unit, at least one query matrix corresponding to the target attention task, at least one key matrix corresponding to the target attention task, at least one value matrix corresponding to the target attention task and at least one mask matrix corresponding to the target attention task by using the computing unit; and executing the target attention task according to the at least one query matrix, the at least one key matrix, the at least one value matrix and the at least one mask matrix by using the target computing unit, so as to obtain the attention feature.

10. The method according to claim 9, wherein the executing the target attention task according to the at least one query matrix, the at least one key matrix, the at least one value matrix and the at least one mask matrix by using the target computing unit so as to obtain the attention feature comprises:

obtaining a first intermediate feature according to the query matrix and a transpose of the key matrix;

obtaining a second intermediate feature according to the first intermediate feature and the mask matrix;

processing the second intermediate feature by using an activation function, so as to obtain an activation feature matrix; and obtaining the attention feature according to the activation feature matrix and the key matrix.

11. The method according to claim 1, further comprising:

executing a partitioning task using a partitioning unit, so as to partition a parameter matrix corresponding to the feature to be processed based on a length of the parameter matrix corresponding to the feature to be processed and a number of registers to obtain a parameter matrix corresponding to each attention task to be processed, wherein the parameter matrix comprises a query matrix, a key matrix, a value matrix and a mask matrix; and storing, by using a target storage unit, the query matrix, the key matrix, the value matrix and the mask matrix corresponding to each attention task to be processed.

12. The method according to claim 1, further comprising:

executing a sparse representation task by using a sparse representation unit, so as to perform a sparse representation on the feature to be processed based on a scenario category corresponding to a task to be processed.

13. The method according to claim 12, wherein the performing a sparse representation on the feature to be processed based on a scenario category corresponding to a task to be processed comprises:

dividing the mask matrix into a first interval and a second interval by using a diagonal of the mask matrix in response to the scenario category being a causal scenario, wherein the first interval and the second interval do not intersect with each other, and all elements in the first interval are masked; and performing a sparse representation on the feature to be processed by using a mask endpoint position in the second interval.

14. The method according to claim 12, wherein the performing a sparse representation on the feature to be processed based on a scenario category corresponding to a task to be processed comprises:

dividing the mask matrix into a third interval and a fourth interval by using a diagonal of the mask matrix in response to the scenario category being a non-causal scenario, wherein the third interval and the fourth interval do not intersect with each other; and performing a sparse representation on the feature to be processed by using a mask endpoint position in the third interval and a mask endpoint position in the fourth interval.

15. An electronic device, comprising:

at least one processor; and a memory communicatively connected to the at least one processor, wherein the memory stores instructions executable by the at least one processor, and the instructions are configured to, when executed by the at least one processor, cause the at least one processor to:

determine, by using a determination unit, a target attention task from a plurality of attention tasks to be processed, based on a sparse representation corresponding to a feature to be processed, wherein the target attention task is a task corresponding to a non-fully masked region of the feature to be processed, the sparse representation represents a mask position of the feature to be processed, and the mask position represents mask endpoint positions in at least two non-intersecting intervals in a mask matrix corresponding to the feature to be processed; and execute the target attention task by using a computing unit, so as to obtain an attention feature, wherein the at least one processor is further configured to:

determine a mask interval corresponding to the plurality of attention tasks to be processed based on the sparse representation corresponding to the feature to be processed; and determine, by using the determination unit, the target attention task from the plurality of attention tasks to be processed based on the mask interval.

16. The electronic device according to claim 15, wherein the at least one processor is further configured to:

determine, for each attention task to be processed, a plurality of mask endpoint positions in a mask matrix corresponding to each attention task to be processed based on the sparse representation corresponding to the feature to be processed; and determine the mask interval corresponding to each attention task to be processed according to the plurality of mask endpoint positions.

17. The electronic device according to claim 16, wherein the mask position comprises a mask start row and a mask termination row in each column of elements in at least two non-intersecting intervals in the mask matrix corresponding to the feature to be processed; and wherein the at least one processor is further configured to:

determine, based on the sparse representation corresponding to the feature to be processed, the mask start row and the mask termination row in each column of elements in the mask matrix corresponding to each attention task to be processed.

18. The electronic device according to claim 16, wherein the mask position comprises a mask start column and a mask termination column in each row of elements in at least two non-intersecting intervals in the mask matrix corresponding to the feature to be processed; and wherein the at least one processor is further configured to:

determine, based on the sparse representation corresponding to the feature to be processed, the mask start column and the mask termination column in each row of elements in the mask matrix corresponding to each attention task to be processed.

19. The electronic device according to claim 17, wherein the at least one processor is further configured to:

determine the mask termination row in each column of elements as a termination position of the mask interval; and determine the mask start row in each column of elements as a start position of the mask interval.

20. A non-transitory computer-readable storage medium having computer instructions therein, wherein the computer instructions are configured to cause a computer to:

determine, by using a determination unit, a target attention task from a plurality of attention tasks to be processed, based on a sparse representation corresponding to a feature to be processed, wherein the target attention task is a task corresponding to a non-fully masked region of the feature to be processed, the sparse representation represents a mask position of the feature to be processed, and the mask position represents mask endpoint positions in at least two non-intersecting intervals in a mask matrix corresponding to the feature to be processed; and execute the target attention task by using a computing unit, so as to obtain an attention feature, wherein the computer instructions are further configured to cause the computer to:

determine a mask interval corresponding to the plurality of attention tasks to be processed based on the sparse representation corresponding to the feature to be processed; and determine, by using the determination unit, the target attention task from the plurality of attention tasks to be processed based on the mask interval.

* * * * *